Nov. 13, 1962     A. VAN GELDER     3,063,848
FLUID TREATMENT FOR FOOD MATERIALS
Filed June 1, 1959     5 Sheets-Sheet 3

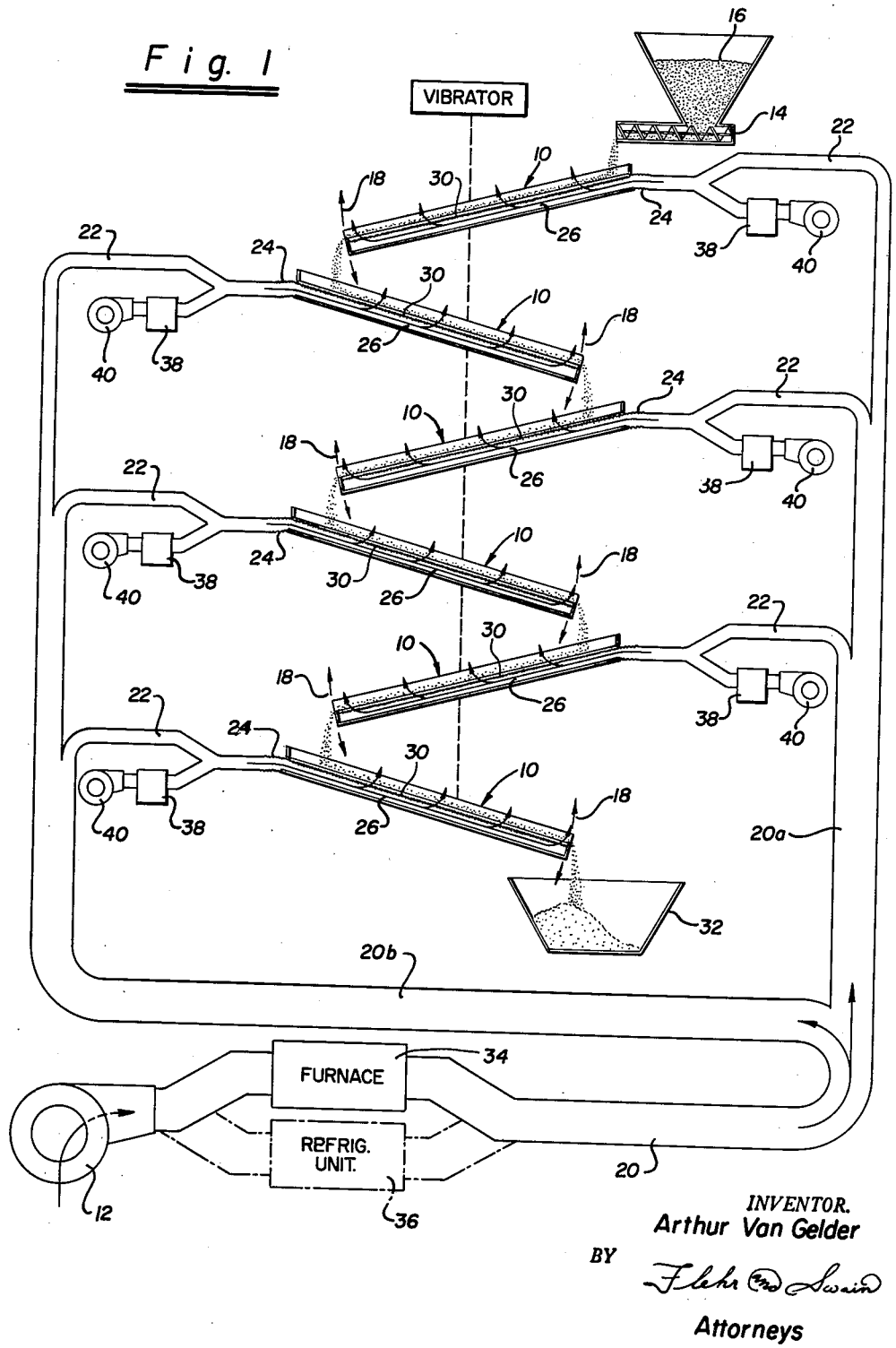

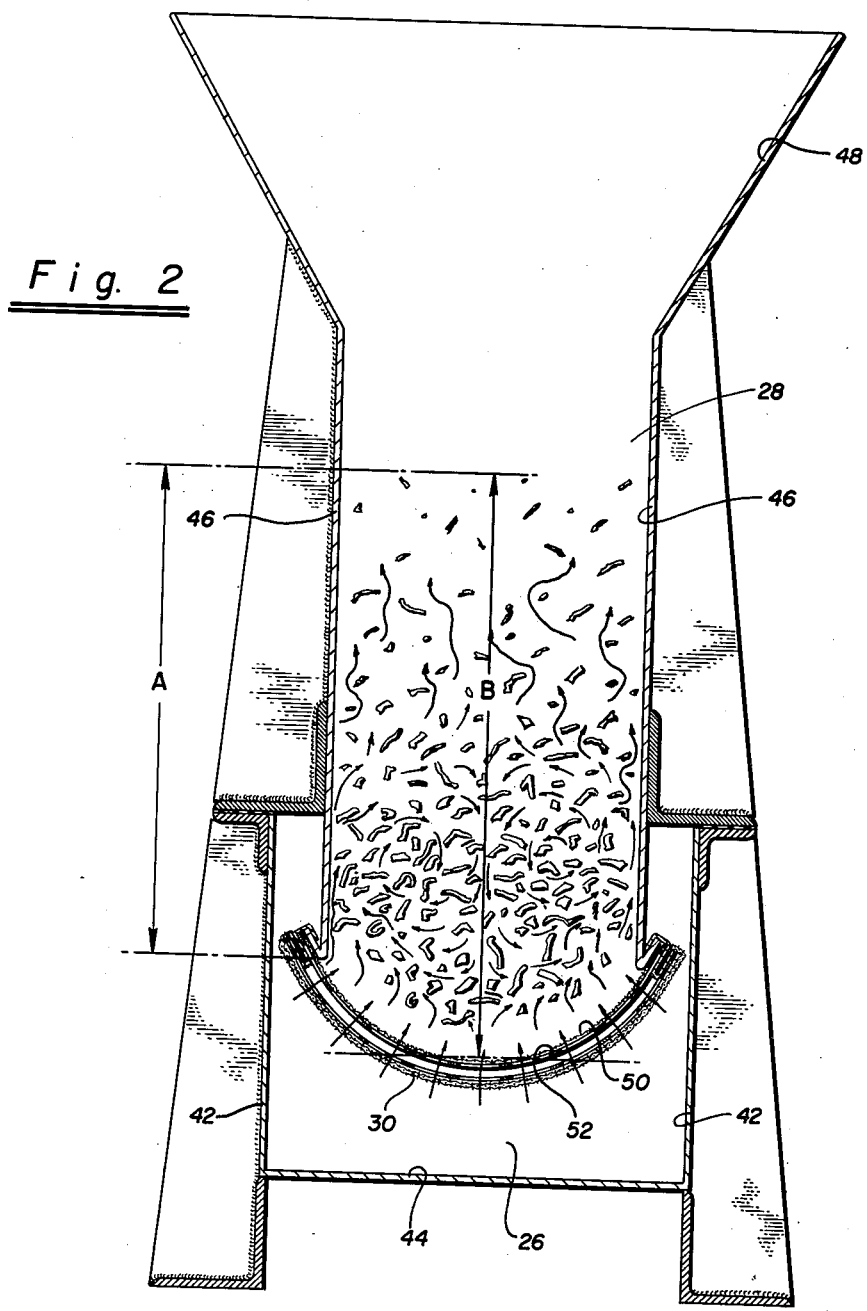

INVENTOR.
Arthur Van Gelder
BY
Attorneys

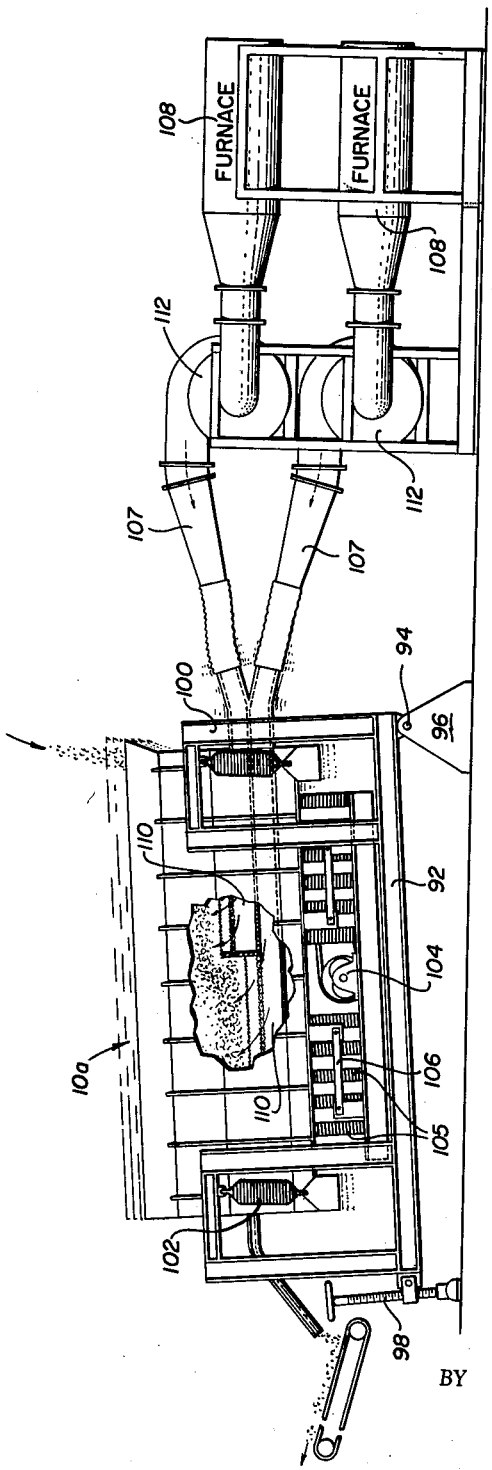

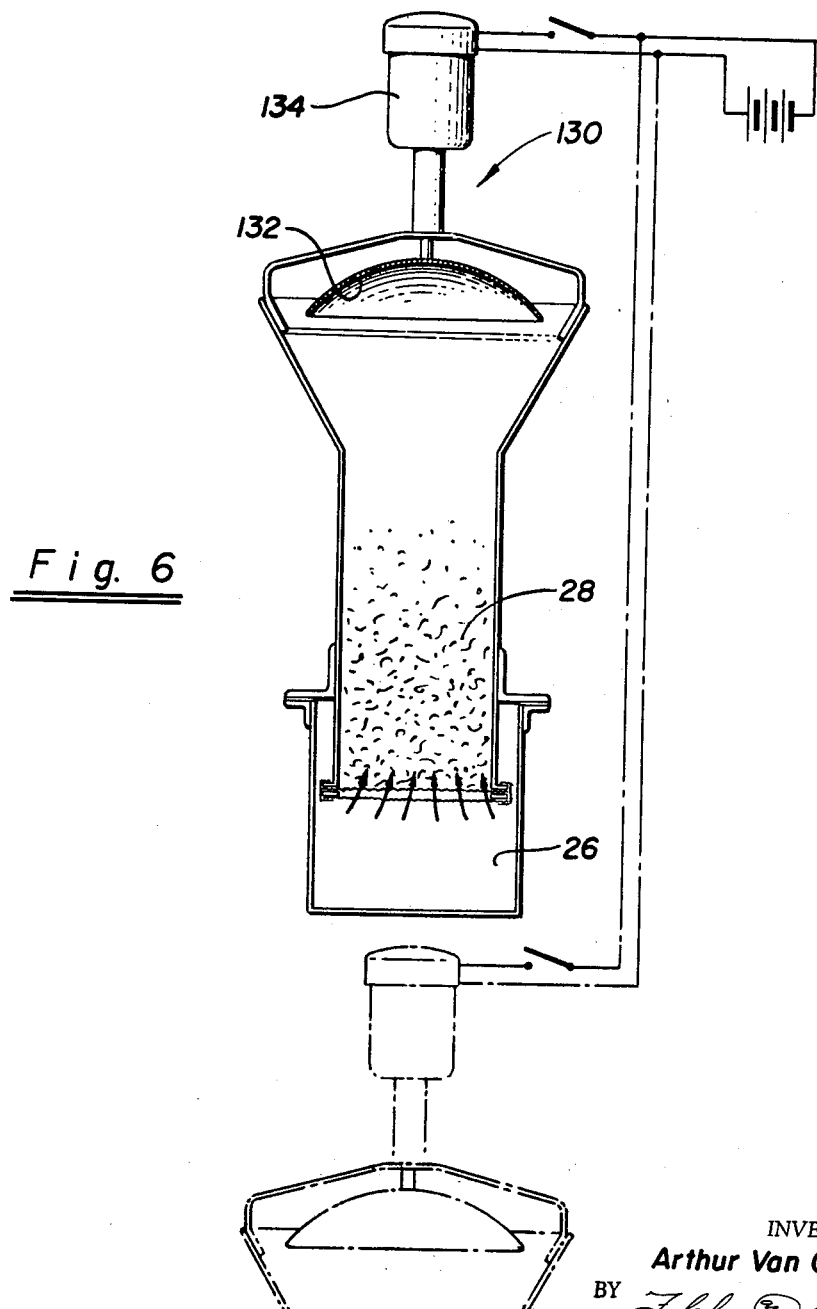

United States Patent Office 3,063,848
Patented Nov. 13, 1962

3,063,848
FLUID TREATMENT FOR FOOD MATERIALS
Arthur Van Gelder, Vacaville, Calif., assignor to Basic Vegetable Products, Inc., San Francisco, Calif., a corporation of California
Filed June 1, 1959, Ser. No. 817,318
10 Claims. (Cl. 99—204)

This invention relates generally to the fluid treatment of various materials, and more specifically to novel means and procedures for use in drying, freezing, toasting, classifying, and liquid treating of such materials.

Although the present invention has wide application, as will appear, it is particularly concerned with the dehydration of various materials and foods, for example, onions, garlic, potatoes and the like. In conventional dehydration processing of such materials, customary practice is to slice or chop the fresh or partially dried material and then subject it to continuous drying by slow movement through a tunnel dryer. Drying may be accomplished in stages, a first stage involving concurrent flow of relatively hot gases (e.g. 160° F.) adjacent the wet stock and later stages involving somewhat cooler gases (e.g. 120° F.) moving countercurrent to the partially dried material. Such drying may remove about 99% of the moisture content of the treated material. Final drying is then accomplished in large bins of the material through which warm gases (about 120° F.) circulate for prolonged periods of time.

Tunnel drying is not only wasteful of space, time and manpower, but also is quite wasteful of the material being treated. A principal difficulty is that the material tends to stick to the trays or conveyor belts on which it is being transported. Loss of material due to such sticking is substantial, frequently amounting to as much as 10% of the weight of the material being treated. Losses may arise in part due to mechanical damage, for example, in attempts to rake or otherwise free the stuck material, or "scorching" may occur. The sticking also necessitates that the trays or belts be washed or scrubbed prior to each re-use so that the useful life of equipment is shortened. When "toasting" of the material is also accomplished, the higher temperatures involved only serve to intensify the problems mentioned.

One object of the present invention therefore is to provide improved means and procedures for the dehydration of materials by which the many problems noted above, as well as additional problems, may be overcome. Specifically the present invention provides a method and apparatus useful in dehydration processing by which space requirements can be reduced to a fraction of the present requirements and by which drying rates can be increased as much as ten to twenty times the present rates of drying. The present invention also eliminates the sticking problem.

Another object of the invention is to provide an improved dehydration process which virtually eliminates mechanical damage, scorching and other causes of injury to the material being dried.

The invention herein is further concerned with improved procedures and means for the freezing preservation of various materials, for example as is now employed in the so-called "quick-freezing" of foods. In conventional quick-freezing processes, the food is washed or otherwise prepared, packed, and passed in the package through a freezing zone wherein a maximum crystal formation is obtained within about thirty minutes, or less. Because the products are being handled in bulk, it is difficult to obtain freezing in such a short time, and the freezing is generally uneven from the exterior of the package to the interior. The freezing also tends to produce a frozen mass within the package that is difficult for the housewife to handle in subsequent cooking operations.

It is another object of the invention, therefore, to provide an improved method and apparatus by which quick freezing can be accomplished in a short period of time and without the objectionable formation of large masses or chunks of frozen material. The processing of the invention permits individual units such as peas, beans, diced carrots, and the like, to be separately frozen and then poured in the frozen state into the package.

It is another object of the invention to provide an improved process and apparatus of such character which is readily adaptable to existing processing and material handling techniques, which is relatively simple and foolproof in operation, and which requires a minimum of supervision.

Other objects and advantages of the invention will appear from the following description and from the drawing in which:

FIGURE 1 is a schematic representation of treatment in accordance with the invention in which six separate treating sections are being employed;

FIGURE 2 is an enlarged view in vertical section of one of the treating sections;

FIGURE 5 is a view partly in elevation and partly schematic of a modified system for carrying out the invention and employing a single, compartmented treating section;

FIGURE 6 is a sectional view of a modified form of the invention in which the material undergoing treatment is also subjected to ultrasonic sound waves; and FIGURE 7 is a like view of a further modification in which the material being treated is suspended in a liquid as it passes through the treating zone.

Figures 3, 4:
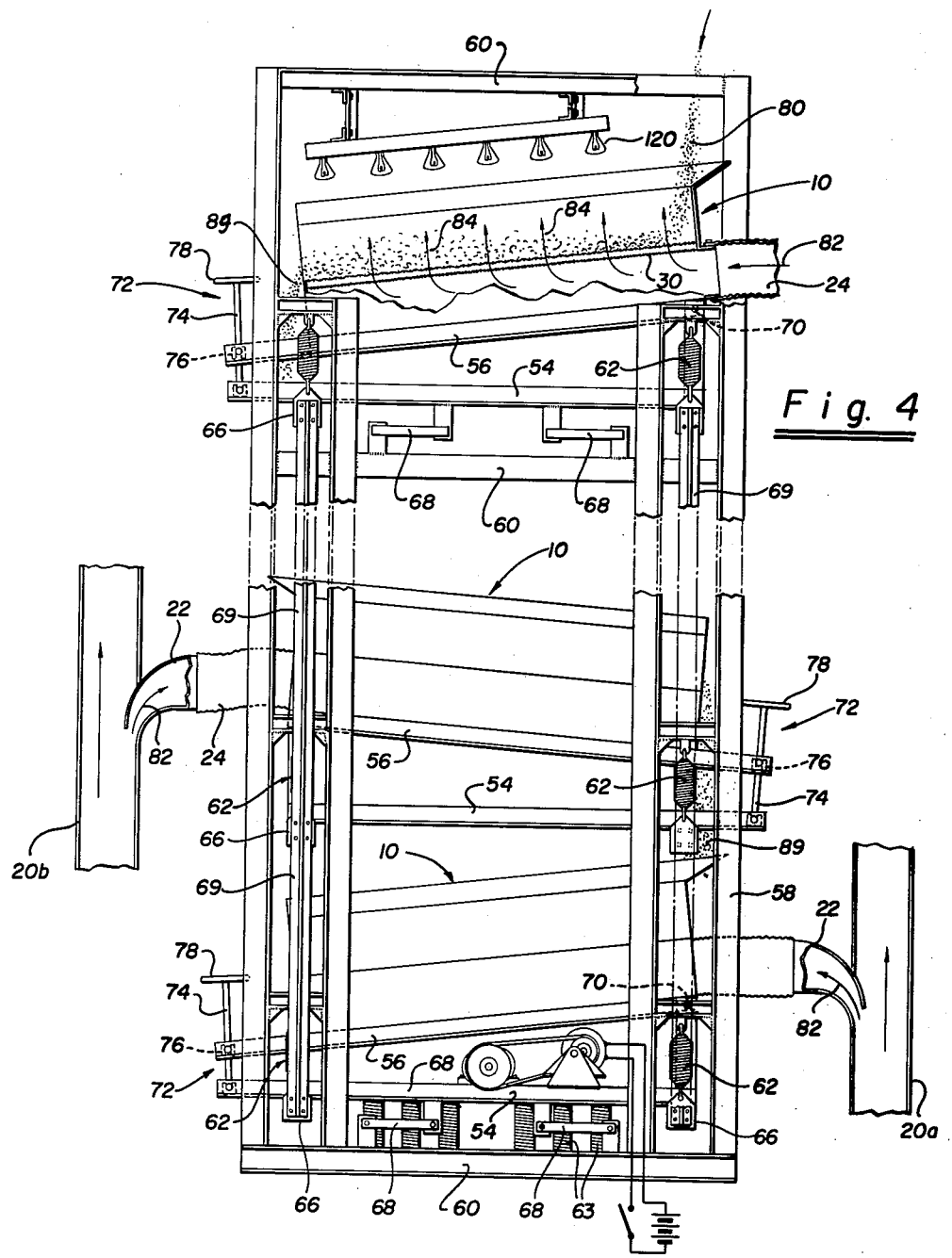
FIGURES 3 and 4 are a view in side elevation illustrating typical apparatus useful in carrying out the invention, with FIGURE 4 also showing a modification of the apparatus employing auxiliary heating elements of the radiant energy type.

The present invention is predicated upon my discovery that the effect and rate of gaseous treatment of materials is greatly enhanced and increased when the material is subjected in the treating zone simultaneously to:

(1) A high velocity gas flow passing upwards through the material and in particular a high velocity gas flow sufficient to cause "flotation" or fluidization of the material within the treating zone.

(2) A vibratory motion of such a nature and extent that the material in the treating zone maintains a constant level, exposes fresh surfaces of the material to the flow of treating fluids or gases and prevents sticking to the surfaces with which the material may come in contact, and in particular, a vibratory motion having primarily a vertical component with little or no horizontal component.

(3) Variable gravitational forces sufficient to provide an efficient, effective control over material movement through the treating zone.

In accordance with this invention, treatment can be with heated, chilled, dehydrated and/or humidified gases, or any combination of these. As a further variation, treatment may be accompanied by exposure of the material to electromagnetic radiation and in particular to exposure to radiation of the high frequency range (e.g. "microwaves" or radiations in the "infrared" range), or by exposure of the material to ultrasonic sound waves, or to a combination of these. The treated material can also be suspended in liquid in the treating zone.

It is contemplated that the present invention will have specific application to the drying, freezing or toasting of various foods, including the separation of various impurities such as chaff and skins of such foods. By way of illustration, the invention is particularly effective in the dehydration of such foods as onions and garlic with removal of from 70 to 99% of the total moisture present in such materials being easily accomplished in one or two hours or less. The dry outer skins of such foods, which have no inherent food value, are simultaneously removed with the exhaust treating gases. Similar dehydration results can be had with other foods such as potatoes, sliced pears, apricots, tomatoes, etc.

Apparatus useful in carrying out the invention may consist of a single treating section, or as illustrated schematically in FIGURE 1, may comprise a series of treating sections 10, each capable of being supplied continuously with a flow of treating gas under pressure from the blower 12. The blower 12 supplies hot air or other treating gas to the main conduits 20, branch conduits 22 and flexible couplings 24. The latter introduce the gas to the treating sections. Each treating section 10 consists in general of two parts; an enclosed plenum 26, through which a continuous flow of treating gas under pressure is introduced, and a "deck" 30 on which the material is treated. A suitable feed mechanism, such as the screw conveyor 14, can be employed to deliver the feed material 16 to the uppermost section 10. Within each section, the rate of conveyance, as well as the depth and period of retention of the treated material, is determined by the angle of tilt of the section, as indicated by the arrows 18.

As best illustrated in FIGURE 2, the plenum 26 is separated from the main treating zone 28 of the sections by a foraminous pressure equalizing device 30 which acts to admit the air in such manner as to cause a uniform distribution of the admitted gases and a consequent "flotation" of the treated material within the rising gas stream. The construction of the device 30 is very critical to the invention since it must act at all times to admit air into the treating zone 28 at a uniform pressure and velocity over its entire surface. More specifically, I have found that the static pressure of the gas in the plenum 26, without the material proposed to be treated being on the deck, must be greater than the static pressure caused by the product itself. In other words, assuming that $P_o$ represents the static pressure caused by foraminous material and $P_m$ the increased static pressure caused by material being treated, $P_o$ must always be greater than $P_m - P_o$. If $P_o$ is less than $P_m - P_o$, localized channeling or "blow holes" will develop through the layer of material being treated. In contrast, maintenance of conditions whereby $P_o$ is greater than $P_m - P_o$ insures that a uniform pressure and velocity will be maintained over the entire surface of the foraminous material. Although any foraminous or porous material capable of achieving these conditions of operation can be employed, I have found that best results can be obtained by use of a stainless steel, double weave wire cloth of approximately 20 by 200 mesh, or an equivalent material. Preferably the foraminous material is arranged in the form of a hollow trough so that air introduced into the treating zone also acts to positively intermix and tumble the material being treated, thereby intensifying the "fluidization" obtained. More specifically the pressure at the sides of the trough, as represented by A, will be less than the pressure B at the center. The result is a generally rotational motion of the bed towards the sides, as indicated in FIGURE 2.

The material within the treating section 10 is preferably also subjected to the simultaneous effects of very rapid vibration in substantially the plane of the foraminous material 30. Such vibration can be accomplished by any of the conventional mechanisms, such as mechanical eccentrics or pneumatic vibrators, etc. The effect of the vibration is to agitate the material undergoing treatment thereby to assist in the desired fluidized action or flotation of the material within the treating zone, and also to assist in maintaining a cross-sectional level of the material bed. As the vibrating deck 30 has only a momentary contact with the treated material, the material cannot stick to its surface. Likewise the violent agitation within the fluidized zone of treatment prevents sticking of the individual pieces of the material to one another. The vibration also assists the gravitational forces in advancing the treated material from one section to the next until it is finally collected in the accumulator 32.

As illustrated in FIGURE 1, means are provided for regulating the temperature of the air supplied to the plenums 26 of the treating sections 10. Such means can conveniently comprise a furnace 34, or a refrigeration unit 36, positioned in the main conduit 20. Preferably auxiliary heaters 38 are also provided in the branch conduits 22, and may be used in conjunction with auxiliary blowers 40. In dehydration processing, the auxiliary heaters 38 permit the various sections 10 to be operated at different temperature levels. In freezing processing, the blowers 40 would in most instances be operated without the auxiliary heaters 38, since the temperature of the air supplied to a particular section can be more easily regulated by mixing with air at room temperature.

Referring more specifically to FIGURE 2, each section 10 can comprise lower wall means 42 and 44 forming the inlet chamber 26 extending longitudinally of the sections, and the upper side walls 46 forming the treating zone 28. Preferably the walls 46 have tapering upper portions 48 adapted to return any material accidentally escaping from the treating zone. As illustrated, the foraminous material 30 is supported to form a shallow trough extending across the bottom opening between the side walls 46, and interrupting the flow of treating gases into the treating zone. Preferably the upper surface of the material 30 is separated from the treating zone by a lighter open mesh screen 50, with both the material 30 and screen 50 being suitably supported as by the expanded metal frames 52. In operation, the air entering the plenums 26 is maintained under sufficient pressure to cause flotation of the treated materials at a substantial distance from the screen 50. In the event of a pressure drop, the screen 50 can function to prevent clogging of the upper surface of the foraminous material 30, thus insuring a continuous fluidization or flotation of the material in the treating zone.

FIGURES 3 and 4 illustrate a particular apparatus useful in carrying out the invention. In this embodiment the treating sections 10 are each supported by a subframe comprising the members 54 and 56. These subframes are in turn resiliently supported on a main frame including the uprights 58 and cross bracing members 60 by means of the suspension springs 62. Compression springs 63 can also be employed as a bottom support. Preferably the various treating sections 10 are joined for simultaneous vibration relative to the main frame by the vertical connecting members 69, secured by suitable brackets 66 to each of the subframe members 54. Vibration can be conveniently accomplished by a single eccentric vibrator mounted on one of the subframes 54, as illustrated in FIGURE 3. A desired vertical vibration of the several sections can be accomplished by suitable parallel motion linkages 68 which preferably connect the upper and lower subframe members 54 to the main cross frame members 69.

It is a feature of the invention that movement of material undergoing treatment through the various sections is accomplished by a variable tilting of the treating sections relative to the main frame. In the apparatus of FIGURES 3 and 4, such variable tilting is accomplished by pivotally mounting one end of the treating section on its subframe as at 70 and by providing adjusting means 72 to rotate the opposite end of the treating section about such pivot. As shown the adjusting mechanism comprises the threaded element 74 pivotally mounted at its lower end on the subframe member 54 and threadedly engaging the pivot member 76 secured between the free ends of the subframe members 56. Preferably a hand wheel 78 is provided to permit rotation of the threaded element 74. As will be understood, rotation of the hand wheel 78 will cause pivotal movements of the free end of the subframe 56 relative to the subframe 54, the direction of movement depending upon the direction of rotation of the hand wheel. The limited pivoting obtained in this manner is easily accommodated by the flexible connections 24 with the conduits 22 supplying the treating gases.

The operation of the apparatus just described is generally as follows: Assuming dehydration processing, raw sliced feed material 80 is fed to the upper treating section 10 where it is subjected to the effects of treating gases entering at 82 and rising uniformly through the foraminous material 30 in a uniform pattern of fluid flow as indicated by the arrows 84. The effect is to maintain the feed material in a state of constant fluidization or "flotation" in a zone spaced from the material 30, as generally indicated in FIGURE 2. The temperature of the entering gas is regulated, as desired, by control of the furnace 34 and the auxiliary heater 38 for this section. The tilting mechanism 72 is adjusted to a desired angle of tilt to provide a predetermined period of retention and depth of the feed 80 in the upper treating section. The material discharging at 89 falls by gravity into the next treating section below which is similarly regulated as to the temperature of the entering treating gases and the angle of tilt. The raw feed is continuously treated in this manner, progressing from one section to the next, until it finally falls from the lowermost section in a substantially dry dehydrated form.

Freezing processing is substantially identical to that just described except that the treating gases entering at 82 are refrigerated by the unit 36 rather than heated. A particular advantage of such processing over conventional freezing processing, however, is that each individual unit of the material being treated is independently frozen while in a fluidized agitated state. This not only permits a much more uniform, rapid freezing than has heretofore been possible, but virtually eliminates the formation of frozen blocks of material. The particles of feed material are separately frozen and can be poured or otherwise easily conveyed for packaging.

FIGURE 5 illustrates a modified apparatus employing a single compartmented treating section 10a conveniently mounted on the floor of the operating area. The support for the section includes a frame 92 pivotally mounted at one end 94 by the stanchions 96 and at the other end by a tilt adjust mechanism 98, which may be similar in construction to the one illustrated in FIGURES 3 and 4. The treating section 10a can be resiliently suspended on the vertical subframes 100 by the spring means 102 and is independently vibrated by the unit 104 suspended by the springs 105 and connected by suitable parallel motion linkages 106. It is a feature of this form of the invention that the temperature of the treating gases supplied to the section can be varied along its length. This can be accomplished by separate ducts 107 communicating with separate inlet compartments or passages 110, which in turn can be independently supplied by separate furnaces 108 and blowers 112. The temperature of the treating gases can be additionally controlled to some extent by conventional louvered mixers (not shown) which mix air at room temperature with the heated gases. Preferably the furnace units and mixers are controlled by a suitable automatic control device in a manner well known to those skilled in this art.

Although illustrated as a single unit it will be understood that a plurality of sections 10a might be employed and arranged, for example, as in FIGURE 1. FIGURE 5 also illustrates a stepped construction of the treating section, by which a cascading or drop turning of the treated material can be obtained. Such construction can coincide the separate compartments 110, each of which can be provided with a separate foraminous deck to equalize pressure. In other respects, however, the operation of the modified apparatus of FIGURE 5 is not unlike that described in connection with the principal embodiment illustrated in FIGURE 3.

In dehydration processing, it is frequently desirable to supplement the treatment that has been so far described by exposing the material under treatment to the actions of electromagnetic radiation, and in particular to electromagnetic radiation in the high frequency range or in the infrared range. It is known, for example, that high frequency radiations have deep penetration qualities, whereby certain materials can be heated with unusual efficiency and can accomplish rapid heating and vaporization of moisture. The combined treatments can, therefore, have the effect of greatly accelerating the dehydration processing. The temperature of the material under treatment can be substantially controlled during treatment by regulating the temperature of the gas passing through the material. This would be a feature of singular advantage in processing materials subject to quality deterioration at temperatures above a critical range.

FIGURE 4 illustrates a modification of the apparatus by which the effects of exposing the material to electromagnetic waves and the fluidization or flotation treatment with gases can be simultaneously accomplished. As illustrated, a plurality of radiant heating elements 120 are conveniently mounted on the main cross frame 60 so as to direct radiant energy toward the fluidized mass of treated material within a section 10 below. These elements may be of any type suitable for the purpose such as heated metal filaments or radiant lamps, as illustrated. Electrical energy can be supplied to the elements 120 through conventional rheostats or transformers (not shown) controlling the power input to such elements.

A similar effect can be obtained by the use of high frequency electromagnetic waves, specifically, microwaves, having a wave length ranging from about 2 millimeters up to about 50 centimeters in length. The deep penetrating ability of these waves enables them to impart their heat energy equivalent to the dielectric material being treated in considerable depth.

The internal heating of the material increases the differential vapor pressure between center of the mass of material being treated and its outside surface. This treatment can be used to supplement the treatment of gases passing upwardly through the treating section 10. For example, where high temperatures might adversely affect quality, cold gases might be circulated in the sections to accomplish freezing, cooling, removal of moisture and fluidization with the product being simultaneously heated internally by means of high frequency electromagnetic waves.

It is also contemplated that ultra high frequency sound waves may be employed, for example, to obtain a faster dehydration or freezing rate by agitation of the internal cellular structure of the product undergoing treatment. As illustrated in FIGURE 6, such effect can be accomplished by use of an electrodynamic resonator 130 or other ultrasonic applicator attached directly to the upper edge of a treating section. Such device can employ the moving-coil principle for the generation of high amplitude sound waves. In this case the magnet is clamped and a disc-shaped diaphragm 132 is attached to the moving coil which is coupled to the magnetic structure by a relatively soft spring. The magnetic driver is contained in the case 134 and the diaphragm 132 connected to the driver by a slender rod mounted in the tube through which an air stream is injected into the fluidized mass of material being created. This type treatment takes advantage of the fluidized state of the treated material by decreasing its mass reactance and thereby causing a gaseous type cavitation much as in the use of ultrasonics in conventional liquid treatment.

The following specific examples are illustrative of the processing in accordance with the invention.

EXAMPLE 1

Employing apparatus as in FIGURE 1, in two separate six-section stages, sliced raw onions having an approximate total solids on a weight basis of 14% are fed to the first section of the first stage at a rate of 500 pounds per minute. Each dehydrating section of the two stage system is 20 feet in length and 6 feet in width providing a total dryer length of 240 feet and a total screen area of 1440 square feet.

The first stage is vibrated at an approximate rate of 12 oscillations per second. The sections of the second stage are not vibrated. The air inlet of each section is through a twill cloth wire screen of 20 x 200 mesh. Heated air is supplied to each section at a rate to produce an air velocity through this screen of 500 feet per minute.

The moisture present in the air admitted is approximately 52 grains of moisture per pound of dry air. The temperature of the air supplied to each section is as indicated in Table I below. The effects of the processing at each stage and also for the overall apparatus are also indicated in the table.

EXAMPLE 2

The procedure of Example 1 is repeated except that the feed is raw sliced garlic having an approximate total solids on a weight basis of 35%. The garlic slices are fed at a rate of 100 lbs. per minute. The width of each dryer section is 14.4 inches, providing a total screen area of 288 square feet. The rate of air flow through the twill cloth wire screen is varied to produce an air velocity of 400 feet per minute. The results produced by this processing are set forth in Table II.

*Table II*

| | Section | Temperature Inlet Air (° F.) | Bed Depth (Inches) | Percent Moisture Removed per Section | Total Percent Moisture Removed | Retention Time of Product In Section (Minutes) | Total Retention Time of Product In Dryer (Minutes) | Feed Rate per Section (Lbs./Min.) |
|---|---|---|---|---|---|---|---|---|
| I | II | III | IV | V | VI | VII | VIII | IX |
| 1st Drying Stage With Vibration. | 1 | 120 | 6 | 9.56 | 9.56 | 3.54 | 3.54 | 100 |
| | 2 | 120 | 6 | 10.20 | 19.76 | 3.78 | 7.32 | 93.2 |
| | 3 | 120 | 6 | 10.95 | 30.71 | 4.06 | 11.38 | 87.1 |
| | 4 | 120 | 6 | 7.95 | 38.66 | 4.42 | 15.80 | 80.1 |
| | 5 | 120 | 6 | 8.53 | 47.19 | 4.74 | 20.54 | 74.9 |
| | 6 | 120 | 6 | 5.62 | 52.81 | 5.11 | 25.65 | 69.3 |
| 2nd Drying Stage Without Vibration. | 1 | 120 | 6 | 5.94 | 58.75 | 5.40 | 31.05 | 65.7 |
| | 2 | 120 | 6 | 5.18 | 63.93 | 5.75 | 36.80 | 61.8 |
| | 3 | 120 | 9 | 4.54 | 70.29 | 9.08 | 45.88 | 58.5 |
| | 4 | 120 | 9 | 1.98 | 72.27 | 9.90 | 55.78 | 54.3 |
| | 5 | 120 | 12 | 2.69 | 74.96 | 13.46 | 69.24 | 53.0 |
| | 6 | 120 | 12 | 2.76 | 77.72 | 13.80 | 83.03 | 51.4 |

The volume of air used in this processing is 115,000 cubic feet per minute, and the discharge rate of dehydrated garlic at the end of the dryer is 50.1 pounds per minute (moisture content 30%). Separation of the chaff and skins is again effectively accomplished.

EXAMPLE 3

In a procedure similar to that described in Example 2, infrared lamps are used as a source of brilliant radiant heat, in the manner illustrated in FIGURE 4. The radiant heat temperature on a black body basis is 420° F.

*Table I*

| | Section | Temperature Inlet Air (° F.) | Bed Depth (Inches) | Percent Moisture Removed per Section | Total Percent Moisture Removed | Retention Time of Product In Section (Minutes) | Total Retention Time of Product In Dryer (Minutes) | Feed Rate per Section (Lbs./Min.) |
|---|---|---|---|---|---|---|---|---|
| I | II | III | IV | V | VI | VII | VIII | IX |
| 1st Drying Stage With Vibration. | 1 | 240 | 6 | 10.89 | 10.89 | 3.13 | 3.13 | 500 |
| | 2 | 240 | 6 | 12.24 | 23.13 | 3.52 | 6.65 | 453 |
| | 3 | 200 | 6 | 17.09 | 40.22 | 4.07 | 10.72 | 399 |
| | 4 | 140 | 6 | 10.34 | 50.56 | 5.22 | 15.94 | 316 |
| | 5 | 140 | 6 | 12.57 | 63.13 | 6.35 | 22.29 | 280 |
| | 6 | 140 | 6 | 16.79 | 79.92 | 8.48 | 30.77 | 226 |
| 2nd Drying Stage Without Vibration. | 1 | 140 | 6 | 8.48 | 88.40 | 8.48 | 39.25 | 152 |
| | 2 | 140 | 6 | 5.94 | 94.34 | 8.48 | 47.73 | 112 |
| | 3 | 140 | 9 | 1.65 | 95.99 | 12.72 | 60.45 | 90 |
| | 4 | 140 | 9 | 1.27 | 97.26 | 12.72 | 83.17 | 83 |
| | 5 | 140 | 12 | .085 | 98.11 | 16.96 | 100.13 | 78 |
| | 6 | 140 | 12 | .043 | 98.54 | 16.96 | 117.19 | 73 |

In the table the percent of moisture removal is expressed in terms of the total moisture present in the feed material. The total volume of air used in the processing is 720,000 cubic feet per minute. Such processing produces dehydrated onion slices (moisture content 7%) at a discharge rate of 70 pounds per minute, and acts also to effectively separate the lighter onion skins from the denser portions of the onion.

If desired, the produce can be binned as it is removed from the third section of the second drying stage, with final drying being accomplished in large bins through which warm gases are passed at a temperature of the order of 120° F. The approximate moisture content of the material removed at this point in the drying is 20%.

The temperature of air admitted is 120° F., and air admission is at a rate to give velocity through the screen of 620 feet per minute. Drying proceeds to a moisture content of 5.9% in a total drying period of three hours.

The procedure is repeated without the use of the infrared lamp. Drying to an equivalent moisture content requires a total drying time of 20 hours.

EXAMPLE 4

Granulated potato having a moisture content by weight of 15% is fed to a single stage two-section apparatus of the type illustrated in FIGURE 1 at a rate of 284 pounds per minute. The individual sections of the dehydrator are 20 feet in length and 3 feet 9 inches in width. Air is admitted through the twill cloth wire screen (20 x 200 mesh) at a rate to provide an air velocity of 320 feet per minute. The inlet air temperature is 400° F. The results of the processing for each stage are set forth in Table III below.

Table III

| Section | Temperature Inlet Air (° F.) | Temperature Outlet Air (° F.) | Percent Moisture Removed per Section | Total Percent Moisture Removed | Retention Time of Product In Section (Minutes) | Total Retention Time of Product In Dryer (Minutes) | Feed Rate per Section (Lbs./Min.) |
|---|---|---|---|---|---|---|---|
| I | II | III | IV | V | VI | VII | VIII |
| 1 | 400 | 120 | 28.9 | 28.9 | 4.68 | 4.18 | 284 |
| 2 | 400 | 120 | 28.9 | 57.8 | 6.02 | 10.7 | 224 |

The indicated processing produces dehydrated potato granules (7% moisture content) at a rate of 164 pounds per minute.

EXAMPLE 5

Employing the apparatus of FIGURE 1 having six cascading sections, each 20 feet in length and 14 inches in width, raw sliced onions are fed at a rate of 100 pounds per minute. Chilled air at a temperature of −20° F. is applied to each section at a rate to produce an air velocity through the screen (20 x 200 mesh) of 200 feet per minute. The freezing time is approximately five minutes and the output capacity of the frozen onion slices is approximately 5800 pounds per hour.

I claim:

1. In a process of fluid treatment of food materials by which an alteration in the condition of the treated material is obtained, the simultaneous steps of subjecting the material in a treating zone to vibration and fluid flow sufficient to cause flotation and fluidization of the material, said vibration and fluid flow acting also to prevent sticking and to constantly expose fresh surfaces of the material to the flow of fluid, and simultaneously advancing said material downward by controlled gravitation to move said material through the zone at a rate corresponding to a desired retention time of material within said zone.

2. A process as in claim 1 wherein said flotation and fluidization is caused by the uniform controlled movement of heated gas through the zone to thereby effect dehydration of the material.

3. The process of claim 2 wherein said treatment with heated gas also effects a toasting of the material.

4. A process as in claim 1 wherein said flotation and fluidization is caused by the uniform controlled movement of chilled gas through the treating zone to thereby effect preservation freezing of said material.

5. A process as in claim 1 wherein said fluid flow also effects a classification of the treated material in accordance with the relative density of component particles thereof.

6. A process as in claim 1 wherein said downward moving of the material is accomplished by means of inclined surfaces, the inclinations of which are varied to thereby regulate the movement and consequently the retention time of material in said treatment zone.

7. In a process of fluid treatment of food materials by which an alteration of the physical characteristics of the treated material is obtained, the simultaneous steps of subjecting material in a treating zone to vibration and to a uniform controlled fluid flow whereby the treated material achieves the state of fluidization and flotation in the zone and is caused to form in a layer of predetermined thickness in such zone, simultaneously advancing said material downward by gravitation to move said layer through the zone and to thereby regulate the rate of such movement and depth of said layer of fluidized material, and repeating the aforementioned simultaneous steps in subsequent treating zones arranged in series with the first.

8. A process as in claim 7 wherein the material is moved by gravitation in a direction that is both downward and lateral, the gravitational force acting to cause periodic reversals of the lateral component of the movement.

9. In a process of fluid treatment of food materials by which an alteration of the physical characteristics of the treated material is obtained, the steps of subjecting material in a treating zone to the flow of fluid, employing pressure equalizing means to cause a uniform distribution of the fluid flow and a consequent fluidization and flotation of the treated material within said treating zone, simultaneously subjecting the material in a treating zone to vibration whereby the fluidized material is caused to form in a layer of predetermined thickness in such zone, and simultaneously moving said material downward by gravitation whereby said layer is moved through the zone at a rate corresponding to a desired period of retention of the material within the zone.

10. A process as in claim 9 wherein the flow of fluid in relation to said presure equalizing means is such that the static pressure produced by the pressure equalizing means is greater than the increase in static pressure produced by the material being treated.

References Cited in the file of this patent
UNITED STATES PATENTS

| | | |
|---|---|---|
| 1,472,314 | Webster | Oct. 30, 1923 |
| 2,005,238 | Peebles | June 18, 1935 |
| 2,245,881 | Vissac | June 17, 1941 |
| 2,270,903 | Rudbach | Jan. 27, 1942 |
| 2,419,875 | Birdseye | Apr. 29, 1947 |
| 2,467,318 | Kellogg | Apr. 12, 1949 |
| 2,497,501 | Himmel | Feb. 14, 1950 |
| 2,732,307 | Neel | Jan. 24, 1956 |
| 2,750,681 | Berry | June 19, 1956 |
| 2,847,767 | Carrier | Aug. 19, 1958 |

FOREIGN PATENTS

| | | |
|---|---|---|
| 550,967 | Canada | Dec. 31, 1957 |

OTHER REFERENCES

Roby et al.: "Improvement of Potato Granule Quality by Fluidized Bed Finish Drying," Food Technology, June 1959, pp. 327–331.